(12) United States Patent
Liu et al.

(10) Patent No.: US 10,559,273 B2
(45) Date of Patent: Feb. 11, 2020

(54) DISPLAY SCREEN CONTROL METHOD AND APPARATUS AND TERMINAL

(71) Applicant: Huawei Technologies Co., Ltd., Shenzhen (CN)

(72) Inventors: Wei Liu, Shenzhen (CN); Zhenqi Zhang, Duesseldorf (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 15/550,990

(22) PCT Filed: Feb. 15, 2015

(86) PCT No.: PCT/CN2015/073131
§ 371 (c)(1),
(2) Date: Aug. 14, 2017

(87) PCT Pub. No.: WO2016/127439
PCT Pub. Date: Aug. 18, 2016

(65) Prior Publication Data
US 2018/0040290 A1 Feb. 8, 2018

(51) Int. Cl.
*G09G 5/00* (2006.01)
*G01P 15/00* (2006.01)

(52) U.S. Cl.
CPC ............... *G09G 5/00* (2013.01); *G01P 15/00* (2013.01); *G09G 2330/021* (2013.01); *G09G 2330/026* (2013.01)

(58) Field of Classification Search
CPC .... G06F 3/0346; G04G 17/045; G04G 19/12; G04G 21/00; G04G 21/08; G04C 3/002; G01P 15/00; G09G 2330/021; G09G 2330/026; G09G 17/045; G09G 5/00
See application file for complete search history.

(56) References Cited

U.S. PATENT DOCUMENTS

| | | | |
|---|---|---|---|
| 9,989,996 B2* | 6/2018 | Kim ..................... | G06F 1/163 |
| 10,241,541 B2* | 3/2019 | Kim ..................... | G06F 1/163 |
| 10,379,603 B2* | 8/2019 | Isomura ................ | G04C 3/002 |
| 2008/0238857 A1 | 10/2008 | Zhang et al. | |
| 2011/0093729 A1 | 4/2011 | Mucignat et al. | |
| 2013/0234924 A1 | 9/2013 | Janefalkar et al. | |
| 2014/0077625 A1 | 3/2014 | Amagai | |

(Continued)

FOREIGN PATENT DOCUMENTS

| | | |
|---|---|---|
| CN | 101276530 A | 10/2008 |
| CN | 102713788 A | 10/2012 |

(Continued)

*Primary Examiner* — Amare Mengistu
*Assistant Examiner* — Jennifer L Zubajlo
(74) *Attorney, Agent, or Firm* — Slater Matsil, LLP

(57) ABSTRACT

Embodiments of the present invention disclose a display screen control method and apparatus, and a terminal. The method in the embodiments of the present invention includes obtaining a height difference and an acceleration that are generated when a terminal moves from an initial position to a target position and determining, according to the height difference and the acceleration, whether a first predetermined movement is satisfied. The method also includes when the first predetermined movement is satisfied, triggering the terminal to turn on a display screen.

15 Claims, 8 Drawing Sheets

(56) References Cited

U.S. PATENT DOCUMENTS

2014/0204017 A1 7/2014 Wu
2016/0306436 A1* 10/2016 Huang .................. G04C 3/002
2017/0109011 A1 4/2017 Jiang

FOREIGN PATENT DOCUMENTS

| CN | 102984352 A | | 3/2013 |
|----|----|----|----|
| CN | 103309618 A | | 9/2013 |
| CN | 103677323 A | | 3/2014 |
| CN | 103699229 A | | 4/2014 |
| CN | 103713740 A | | 4/2014 |
| CN | 103728874 A | * | 4/2014 |
| CN | 103728874 A | | 4/2014 |
| CN | 103793075 A | | 5/2014 |
| CN | 103927019 A | | 7/2014 |
| CN | 103927117 A | * | 7/2014 |
| CN | 103927117 A | | 7/2014 |
| CN | 103941847 A | | 7/2014 |
| CN | 104035321 A | * | 9/2014 |
| CN | 104035321 A | | 9/2014 |
| CN | 104035559 A | | 9/2014 |
| CN | 104063136 A | | 9/2014 |
| CN | 104160686 A | | 11/2014 |
| EP | 1785808 A1 | | 5/2007 |
| EP | 2315101 A1 | | 4/2011 |
| WO | 2013057048 A1 | | 4/2013 |

* cited by examiner

DISPLAY SCREEN CONTROL METHOD AND APPARATUS AND TERMINAL

CROSS-REFERENCE TO RELATED APPLICATIONS

This application is a national stage of International Application No. PCT/CN2015/073131, filed on Feb. 15, 2015, which is hereby incorporated by reference in its entirety.

TECHNICAL FIELD

The present invention relates to the field of communications technologies, and in particular, to a display screen control method and apparatus, and a terminal.

BACKGROUND

With development of communications technologies, and in particular, popularization of wearable devices, a user may query information such as time by viewing a display screen of a wearable device such as a wristband or a wrist watch, or exchange information with a wearable device.

In actual use, a wearable device may determine, according to a carried acceleration sensor, whether to trigger the wearable device to turn on a display screen. For example, when a user views, by raising a wrist, information displayed on a display screen of a wearable device, an acceleration sensor detects an acceleration in a process of raising the wrist by the user, and triggers, when the acceleration is greater than a threshold, the wearable device to turn on the display screen. However, when determining whether a wrist raise movement happens, the acceleration sensor often determines a wrist raise movement caused by arm swing of the user as a wrist raise movement for triggering the wearable device to turn on the display screen. For example, the user wears the wearable device on a wrist, the acceleration sensor detects an acceleration in a process of drastic arm swing of the user during jogging, and the acceleration is greater than a threshold. Consequently the wearable device performs incorrect identification, and triggers the wearable device to turn on the display screen, thereby consuming power.

SUMMARY

Embodiments of the present invention provide a display screen control method and apparatus, and a terminal, so as to reduce power consumption caused by a wearable device turning on a display screen due to incorrect identification of a wrist raise movement characteristic.

To achieve the foregoing objective, the embodiments of the present invention use the following technical solutions.

According to a first aspect, an embodiment of the present invention provides a display screen control method, where the method includes obtaining a height difference and an acceleration that are generated when a terminal moves from an initial position to a target position, where the height difference is a difference between a height of the target position and a height of the initial position. The method also includes determining, according to the height difference and the acceleration, whether a first predetermined movement is satisfied. The first predetermined movement includes the height difference is greater than or equal to a first height threshold, and an absolute value of the acceleration is greater than or equal to a first acceleration threshold. Additionally, the method includes, when the first predetermined movement is satisfied, triggering the terminal to turn on a display screen.

With reference to the first aspect, in a first possible implementation manner of the first aspect, the obtaining a height difference that is generated when a terminal moves from an initial position to a target position includes: obtaining a height, of the terminal, from the initial position to a specified reference surface and a height from the target position to the specified reference surface by using a first sensor, where the first sensor is configured to detect a height from the terminal to the specified reference surface; and obtaining the height difference by means of calculation according to the height from the target position to the specified reference surface and the height from the initial position to the specified reference surface.

With reference to the first aspect, in a second possible implementation manner of the first aspect, the obtaining an acceleration that is generated when a terminal moves from an initial position to a target position includes: obtaining, by using a second sensor, the acceleration that is generated when the terminal moves from the initial position to the target position, where the second sensor is configured to detect the acceleration.

With reference to the first aspect, in a third possible implementation manner of the first aspect, before the obtaining a height difference and an acceleration that are generated when a terminal moves from an initial position to a target position, the method further includes: setting a first timer on the terminal, where the first timer is configured to record a time of moving from the initial position to the target position to generate the height difference; and before the determining, according to the height difference and the acceleration, whether a first predetermined movement is satisfied, the method further includes: obtaining the time recorded by the first timer; determining whether the time recorded by the first timer is less than or equal to a first time threshold; and when the time recorded by the first timer is less than or equal to the first time threshold, performing the determining, according to the height difference and the acceleration, whether a first predetermined movement is satisfied.

With reference to the third possible implementation manner of the first aspect, in a fourth possible implementation manner of the first aspect, before the obtaining a height difference and an acceleration that are generated when a terminal moves from an initial position to a target position, the method further includes: setting a second timer on the terminal, where the second timer is configured to record a time within which an absolute value of an acceleration after the first predetermined movement is satisfied is less than or equal to a second acceleration threshold; and after the first predetermined movement is satisfied, the method further includes: obtaining the time recorded by the second timer; and when the time recorded by the second timer is greater than or equal to a second time threshold, triggering the terminal to turn on the display screen.

With reference to the first possible implementation manner of the first aspect, in a fifth possible implementation manner of the first aspect, the method further includes: determining, according to the height difference and the acceleration, whether a second predetermined movement is satisfied, where the second predetermined movement includes: the height difference is less than or equal to a second height threshold, and an absolute value of the acceleration is greater than or equal to a third acceleration threshold; and when the second predetermined movement is satisfied, triggering the terminal to turn off the display screen.

According to a second aspect, an embodiment of the present invention provides a display screen control apparatus, where the apparatus includes an obtaining module, configured to obtain a height difference and an acceleration that are generated when a terminal moves from an initial position to a target position, where the height difference is a difference between a height of the target position and a height of the initial position. The apparatus also includes a processing module, configured to determine, according to the height difference and the acceleration, whether a first predetermined movement is satisfied. The first predetermined movement includes: the height difference is greater than or equal to a first height threshold, and an absolute value of the acceleration is greater than or equal to a first acceleration threshold. Additionally, the processing module is configured to, when the first predetermined movement is satisfied, trigger the terminal to turn on a display screen.

With reference to the second aspect, in a first possible implementation manner of the second aspect, the obtaining module is specifically configured to obtain a height, of the terminal, from the initial position to the specified reference surface and a height from the target position to the specified reference surface by using a first sensor, where the first sensor is configured to detect a height from the terminal to the specified reference surface; and obtain the height difference by means of calculation according to the height from the target position to the specified reference surface and the height from the initial position to the specified reference surface.

With reference to the second aspect, in a second possible implementation manner of the second aspect, the obtaining module is specifically further configured to obtain, by using a second sensor, the acceleration that is generated when the terminal moves from the initial position to the target position, where the second sensor is configured to detect the acceleration.

With reference to the second aspect, in a third possible implementation manner of the second aspect, the apparatus further includes: a setting module, configured to set a first timer on the terminal, where the first timer is configured to record a time of moving from the initial position to the target position to generate the height difference; the obtaining module is further configured to obtain the time recorded by the first timer; and the processing module is further configured to determine whether the time recorded by the first timer is less than or equal to a first time threshold; and when the time recorded by the first timer is less than or equal to the first time threshold, perform the determining, according to the height difference and the acceleration, whether a first predetermined movement is satisfied.

With reference to the third possible implementation manner of the second aspect, in a fourth possible implementation manner of the second aspect, the setting module is further configured to set a second timer on the terminal, where the second timer is configured to record a time within which an absolute value of an acceleration after the first predetermined movement is satisfied is less than or equal to a second acceleration threshold; the obtaining module is further configured to obtain the time recorded by the second timer; and the processing module is further configured to: when the time recorded by the second timer is greater than or equal to a second time threshold, trigger the terminal to turn on the display screen.

With reference to the first possible implementation manner of the second aspect, in a fifth possible implementation manner of the second aspect, the processing module is further configured to determine, according to the height difference and the acceleration, whether a second predetermined movement is satisfied, where the second predetermined movement includes: the height difference is less than or equal to a second height threshold, and an absolute value of the acceleration is greater than or equal to a third acceleration threshold; and when the second predetermined movement is satisfied, trigger the terminal to turn off the display screen.

According to a third aspect, an embodiment of the present invention provides a terminal, and the terminal includes at least: a processor unit, a storage unit, and a collection unit; the processor unit, the storage unit, and the collection unit are connected to each other, and perform a communications function, and the storage unit is configured to store data involved during running of the terminal; the collection unit is configured to obtain a height difference and an acceleration that are generated when the terminal moves from an initial position to a target position, where the height difference is a difference between a height of the target position and a height of the initial position; and the processor unit is configured to determine, according to the height difference and the acceleration, whether a first predetermined movement is satisfied, where the first predetermined movement includes: the height difference is greater than or equal to a first height threshold, and an absolute value of the acceleration is greater than or equal to a first acceleration threshold; and when the first predetermined movement is satisfied, trigger the terminal to turn on a display screen.

With reference to the third aspect, in a first possible implementation manner of the third aspect, the collection unit is specifically configured to obtain a height, of the terminal, from the initial position to the specified reference surface and a height from the target position to the specified reference surface by using a first sensor, where the first sensor is configured to detect a height from the terminal to the specified reference surface; and obtain the height difference by means of calculation according to the height from the target position to the specified reference surface and the height from the initial position to the specified reference surface.

With reference to the third aspect, in a second possible implementation manner of the third aspect, the collection unit is specifically further configured to obtain, by using a second sensor, the acceleration that is generated when the terminal moves from the initial position to the target position, where the second sensor is configured to detect the acceleration.

With reference to the third aspect, in a third possible implementation manner of the third aspect, before the obtaining a height difference and an acceleration that are generated when the terminal moves from an initial position to a target position, a first timer is set on the terminal, where the first timer is configured to record a time of moving from the initial position to the target position to generate the height difference; and before the determining, according to the height difference and the acceleration, whether a first predetermined movement is satisfied, the collection unit is further configured to obtain the time recorded by the first timer; and the processor unit is further configured to determine whether the time recorded by the first timer is less than or equal to a first time threshold; and when the time recorded by the first timer is less than or equal to the first time threshold, perform the determining, according to the height difference and the acceleration, whether a first predetermined movement is satisfied.

With reference to the third possible implementation manner of the third aspect, in a fourth possible implementation manner of the third aspect, before the obtaining a height difference and an acceleration that are generated when the terminal moves from an initial position to a target position, a second timer is set on the terminal, where the second timer is configured to record a time within which an absolute value of an acceleration after the first predetermined movement is satisfied is less than or equal to a second acceleration threshold; and after the first predetermined movement is satisfied, the processor unit is further configured to obtain the time recorded by the second timer; and when the time recorded by the second timer is greater than or equal to a second time threshold, trigger the terminal to turn on the display screen.

With reference to the first possible implementation manner of the third aspect, in a fifth possible implementation manner of the third aspect, the processor unit is further configured to determine, according to the height difference and the acceleration, whether a second predetermined movement is satisfied, where the second predetermined movement includes: the height difference is less than or equal to a second height threshold, and an absolute value of the acceleration is greater than or equal to a third acceleration threshold; and when the second predetermined movement is satisfied, trigger the terminal to turn off the display screen.

According to the display screen control method and apparatus, and the terminal that are provided in the embodiments of the present invention, after a height difference and an acceleration that are generated when a terminal moves from an initial position to a target position are obtained, whether a first predetermined movement is satisfied is determined according to the obtained height difference and acceleration, and when the first predetermined movement is satisfied, the terminal is triggered to turn on a display screen. Compared with the prior art, in the embodiments of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a," "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

The embodiments of the present invention may be applied to a terminal such as a wearable device, and a sensor for height detection and a sensor for acceleration detection, such as a barometer sensor and a linear acceleration sensor, or a barometer sensor and an angular acceleration sensor, are disposed in the wearable device. When the wearable device moves from one position to another position, heights of the wearable device in the one position and the another position and an acceleration of the wearable device are detected by using the sensors that are disposed in the wearable device, and a height change in the process in which the wearable device moves from the one position to the another position is obtained by means of calculation, that is, a height difference and an acceleration that are generated when the wearable device moves from an initial position to a target position are detected. Then whether a preset first predetermined movement is satisfied is determined according to the obtained height difference and acceleration. When the first predetermined movement is satisfied, the wearable device is triggered to turn on a display screen, so that a user uses the display screen to view information or exchange information with the wearable device.

It should be noted that, sensors disposed in the terminal are not limited to the sensor for height detection and the sensor for acceleration detection that are mentioned in the embodiments of the present invention, and may further include a sensor for detecting another parameter, so that accuracy when the terminal identifies a first predetermined movement is increased by means of detection and determining.

Figure 1:
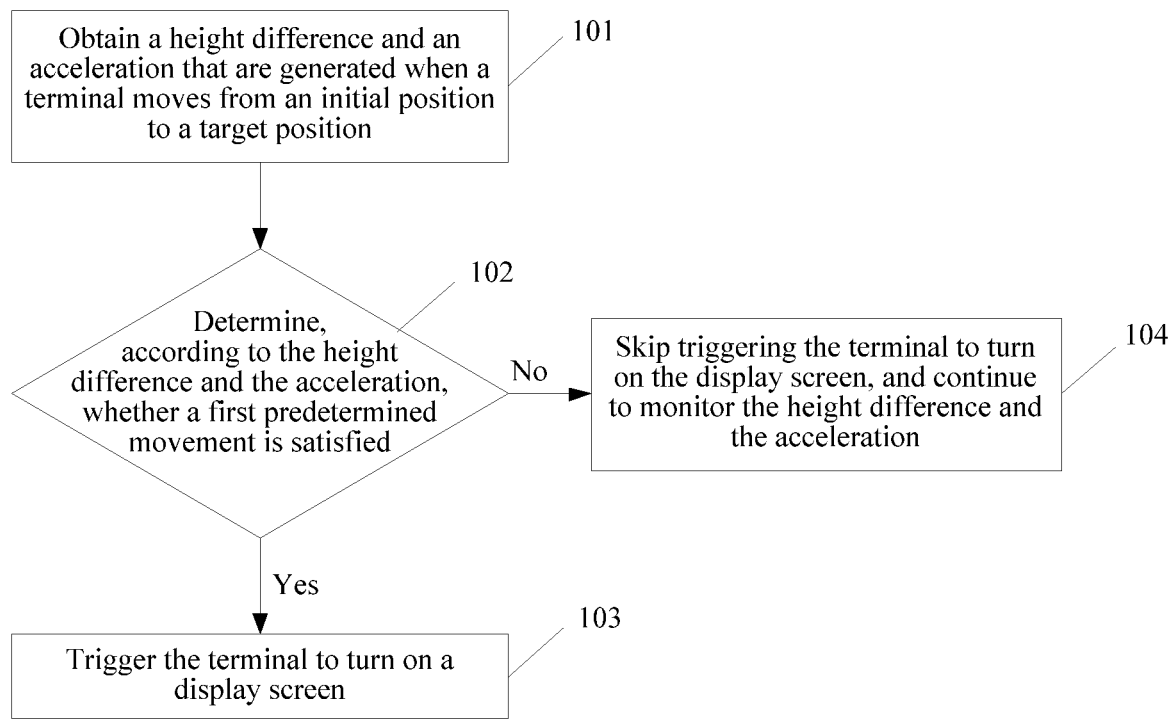
FIG. 1 is a flowchart of a display screen control method according to an embodiment of the present invention.

As shown in FIG. 1, an embodiment of the present invention provides a display screen control method. The method includes the following steps.

101: Obtain a height difference and an acceleration that are generated when a terminal moves from an initial position to a target position.

The height difference is a difference between a height of the target position and a height of the initial position.

Using an example in which the terminal is a wearable device, a user wears the wearable device on a wrist, and the user may move the wrist from a natural droop position to a chest position to trigger the wearable device to turn on a display screen, so as to use the display screen to view a time or exchange information with the wearable device, for example, perform an operation such as answering a phone call or sending a short message service message.

In a process of moving the wrist of the user from the natural droop position to the chest position, heights of the wrist in the natural droop position and the chest position may be detected by using one sensor that is disposed in the wearable device, then a height difference is obtained by means of calculation according to the heights in the two statuses, and an acceleration that is generated in the process is detected by using the other sensor disposed in the wearable device.

It should be noted that, heights of an initial position and a target position may be separately detected by using sensors, and a height difference is obtained by means of calculation, or a height change that is generated by the movement from an initial position to a target position may be directly obtained in another manner, so as to obtain a height difference. A manner in which a terminal obtains a height difference and an acceleration is not limited to the obtaining by detecting different parameters that is mentioned in this embodiment of the present invention, and may further be obtaining by using another measurement means or measurement tool.

102: Determine, according to the height difference and the acceleration, whether a first predetermined movement is satisfied.

The first predetermined movement includes: the height difference is greater than or equal to a first height threshold, and an absolute value of the acceleration is greater than or equal to a first acceleration threshold.

In a process in which the user performs the first predetermined movement, to trigger the terminal to turn on the display screen, using an example in which the first predetermined movement is a wrist raise movement characteristic, when the user wears a wearable device on a wrist and the user needs to view information recorded in the wearable device, the wrist of the user moves from the natural droop position to the chest position, and in a process of the moving of the wrist, a height of the wearable device worn on the wrist of the user relative to a reference surface changes, and a value and a direction of an acceleration also change. Therefore, whether the first predetermined movement is satisfied may be determined by determining a value relationship between a height difference and a first height threshold and a value relationship between an absolute value of the acceleration and a first acceleration threshold. It should be noted that, parameters for determining the first predetermined movement is not limited to the height difference and the acceleration that are mentioned in this embodiment of the present invention, and may further include another parameter for determining whether the first predetermined movement is satisfied. In addition, the first predetermined movement may be preset by the user, and the first predetermined movement may be the wrist raise movement characteristic, or another movement such as a droop movement characteristic.

The terminal may determine, according to the height difference and the acceleration that are obtained in 101, whether the wrist raise movement characteristic is satisfied. In a process of determining whether the wrist raise movement characteristic is satisfied, the terminal may compare the obtained height difference with the first height threshold, and compare the absolute value of the obtained acceleration with the first acceleration threshold.

It should be noted that, the first height threshold and the first acceleration threshold may be preset by the user according to information such as the stature and the arm length, or automatically generated by the terminal according to a history operation of the user. For example: using a wearable device as an example, different height thresholds and acceleration thresholds for different users may be stored in the wearable device, where the user may obtain height differences and absolute values of accelerations when the wrist raise movement is performed multiple times, to determine a height threshold and an acceleration threshold that are appropriate for the user.

103: When the first predetermined movement is satisfied, trigger the terminal to turn on a display screen.

104: When the first predetermined movement is not satisfied, skip triggering the terminal to turn on the display screen, and continue to monitor the height difference and the acceleration.

When the first predetermined movement is not satisfied, the terminal may continue to monitor the height difference and the acceleration of the terminal by using the sensors that are disposed. When the height difference is greater than or equal to the first height threshold, and the absolute value of the acceleration is greater than or equal to the first acceleration threshold, 103 is performed, where the initial position of the terminal does not change, and the target position of the terminal changes as the terminal continuously moves. It should be noted that, in actual use, the user may also update, according to an actual usage requirement, the initial position of the terminal recorded in the sensors.

According to the display screen control method provided in this embodiment of the present invention, after a height difference and an acceleration that are generated when a terminal moves from an initial position to a target position are obtained, whether a first predetermined movement is satisfied is determined according to the obtained height difference and acceleration, and when the first predetermined movement is satisfied, the terminal is triggered to turn on a display screen. Compared with the prior art, in this embodiment of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 2:
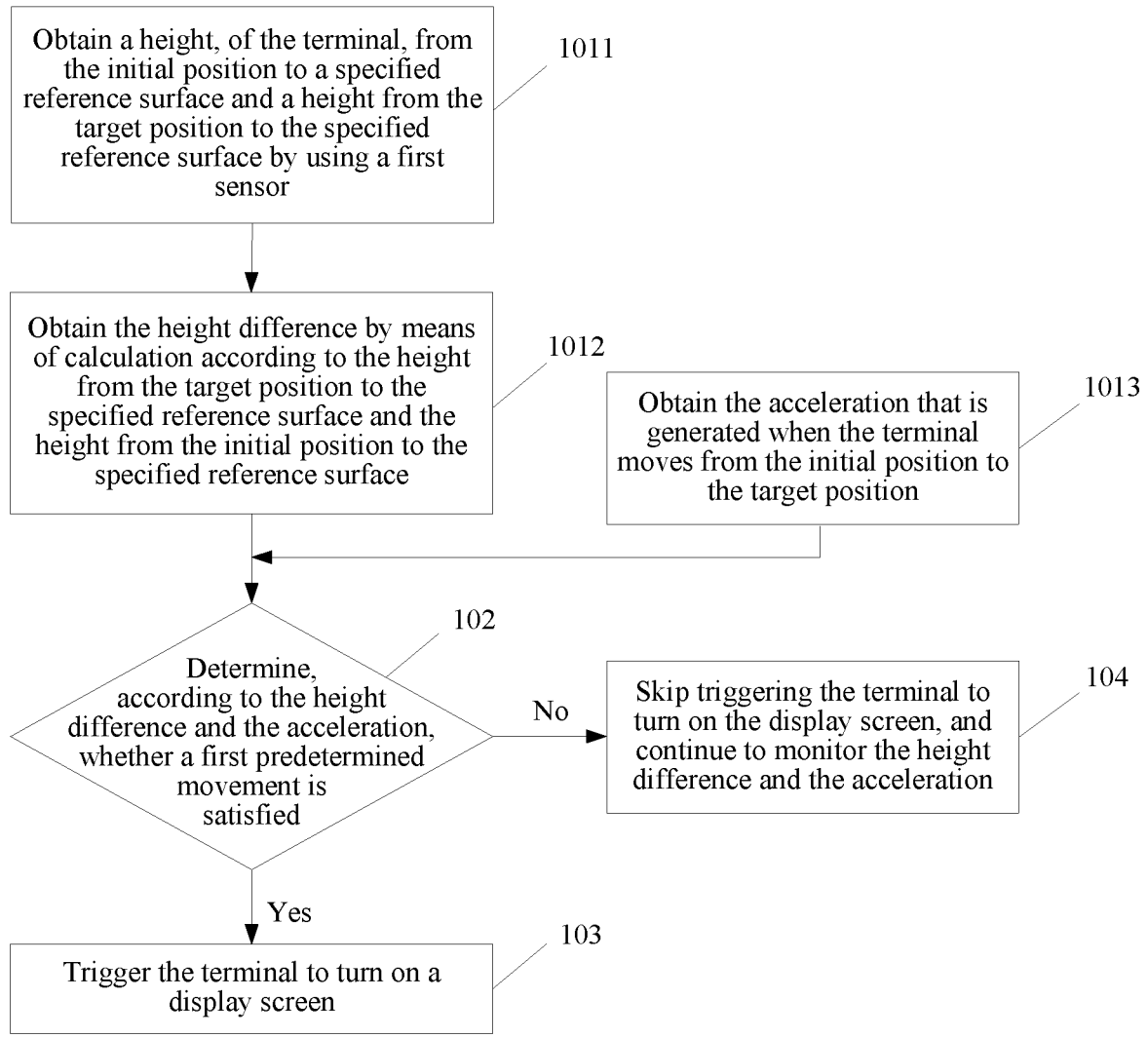
FIG. 2 is a flowchart of another display screen control method according to an embodiment of the present invention.

In this embodiment of the present invention, based on the implementation manner shown in FIG. 1, the obtaining a height difference that is generated when a terminal moves from an initial position to a target position in 101 may be specifically implemented as 1011 and 1012 that are shown in FIG. 2.

1011: Obtain a height, of the terminal, from the initial position to a specified reference surface and a height from the target position to the specified reference surface by using a first sensor.

The first sensor is configured to detect a height from the terminal to the specified reference surface.

It should be noted that, when the first sensor is a height sensor, the specified reference surface may be the sea level; or when the first sensor is another measurement tool for detecting the height from the terminal to the specified reference surface, the specified reference surface may be any surface, and it is ensured that in a process of detecting heights separately from the initial position and the target position to the any surface, a height above sea level of the any surface does not change at all.

In this embodiment of the present invention, the first sensor may be integrated in the terminal, and types and a quantity of sensors integrated in the terminal are not limited to the one first sensor for height detection mentioned in this embodiment of the present invention.

1012: Obtain the height difference by means of calculation according to the height from the target position to the specified reference surface and the height from the initial position to the specified reference surface.

Using a wearable device as an example, in a process in which the user raises a wrist, a barometer sensor separately obtains a height above sea level of an initial position and a height above sea level of a target position, and then the wearable device calculates, according to the height above sea level of the initial position and the height above sea level of the target position that are obtained, a height difference generated in a process in which the wearable device moves from the initial position to the target position. Specifically, the calculation may be performed by subtracting the height above sea level of the initial position from the height above sea level of the target position.

It should be noted that, the first sensor may detect only a height from the initial position to the specified reference surface and a height from the target position to the specified reference surface, and stores the heights into a corresponding storage area, of the first sensor, in the terminal, and then the terminal directly obtains the height from the initial position to the specified reference surface and the height from the target position to the specified reference surface that are in the storage area, and performs calculation. Alternatively, the first sensor may detect a height from each position to the specified reference surface in a process in which the terminal moves from the initial position to the target position, and store the height into a corresponding storage area, of the first sensor, in the terminal, and then the terminal obtains, from the storage area, a height from the initial position to the specified reference surface and a height from the target position to the specified reference surface, and performs calculation.

1013: Obtain the acceleration that is generated when the terminal moves from the initial position to the target position.

In this embodiment of the present invention, 1011, 1012, and 1013 may be performed at the same time, or 1011, 1012, and 1013 may be performed in a particular order.

According to the display screen control method provided in this embodiment of the present invention, a terminal obtains a height of an initial position and a height of a target position by using a first sensor, calculates a height difference according to the obtained heights, and obtains an acceleration that is generated when the terminal moves from the initial position to the target position. After obtaining the height difference and the acceleration that are generated when the terminal moves from the initial position to the target position, the terminal determines, according to the obtained height difference and acceleration, whether a first predetermined movement is satisfied, and when the first predetermined movement is satisfied, the terminal is triggered to turn on a display screen. Compared with the prior art, in this embodiment of the present invention, not only an acceleration generated when a wearable device moves from one position to another position is obtained, but also heights of the wearable device in the one position and the another position are obtained by using a first sensor for height detection, so that a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 3:
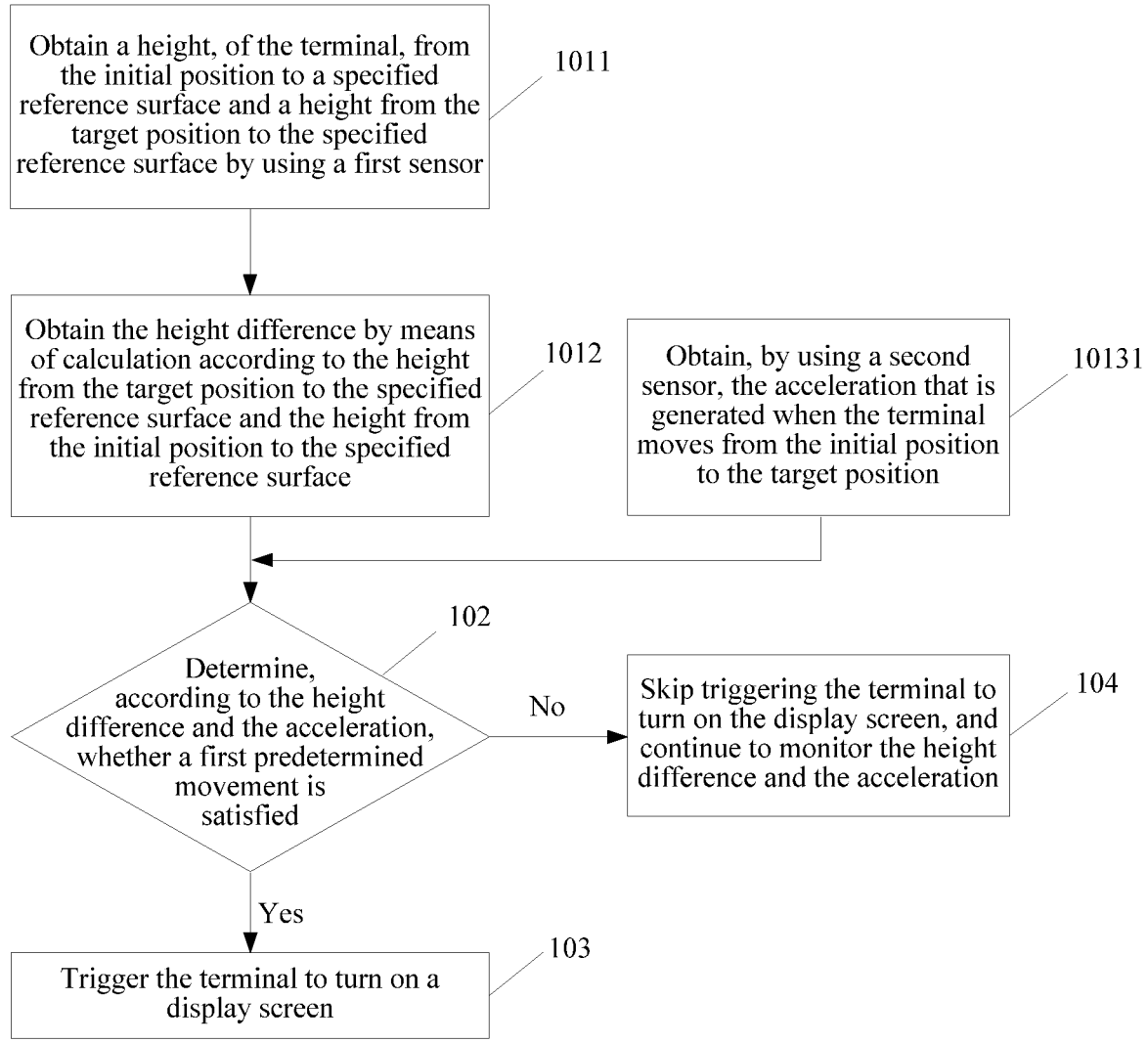
FIG. 3 is a flowchart of another display screen control method according to an embodiment of the present invention.

In this embodiment of the present invention, based on the implementation manner shown in FIG. 1, the obtaining an acceleration that is generated when a terminal moves from an initial position to a target position in 101 may be specifically implemented as 10131 shown in FIG. 3.

10131: Obtain, by using a second sensor, the acceleration that is generated when the terminal moves from the initial position to the target position.

The second sensor is configured to detect the acceleration.

It should be noted that, in this embodiment of the present invention, the second sensor may be integrated in the terminal, and types and a quantity of sensors integrated in the terminal are not limited to the one second sensor for acceleration detection mentioned in this embodiment of the present invention.

According to the display screen control method provided in this embodiment of the present invention, a height difference generated when a terminal moves from an initial position to a target position is obtained, and an acceleration generated when the terminal moves from the initial position to the target position is obtained by using a second sensor. After the height difference and the acceleration that are generated when the terminal moves from the initial position to the target position are obtained, whether a first predetermined movement is satisfied is determined according to the obtained height difference and acceleration. When the first predetermined movement is satisfied, the terminal is triggered to turn on a display screen. Compared with the prior art, in this embodiment of the present invention, not only an acceleration generated when a wearable device moves from one position to another position is obtained by using a second sensor for acceleration detection, but also heights of the wearable device in the one position and the another position are obtained, so that a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 4:
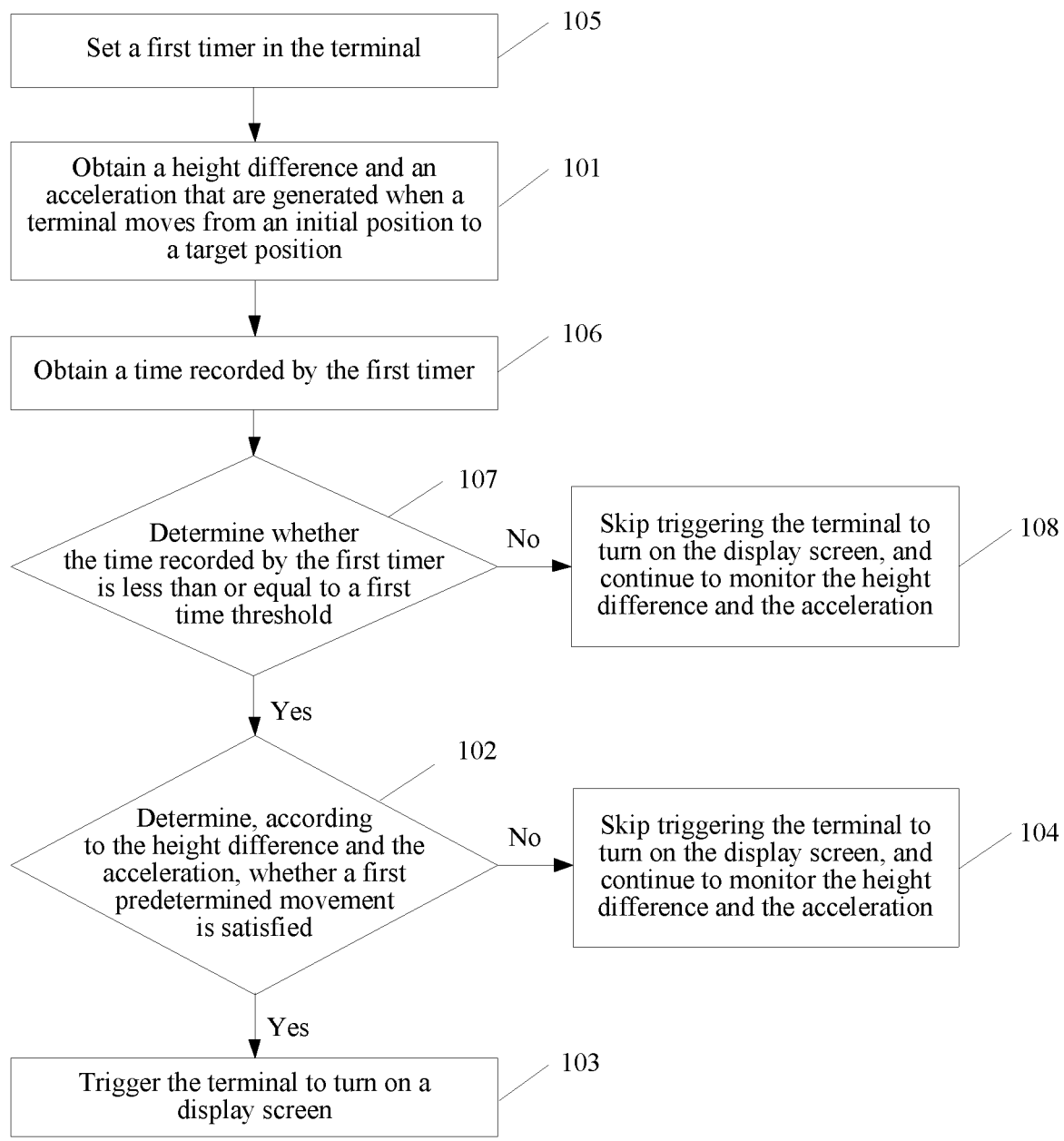
FIG. 4 is a flowchart of another display screen control method according to an embodiment of the present invention.

In this embodiment of the present invention, based on the implementation manner shown in FIG. 1, the method may be further implemented as an implementation manner shown in FIG. 4.

Before 101, the method further includes 105.

105: Set a first timer in the terminal.

The first timer is configured to record a time of moving from the initial position to the target position to generate the height difference. Using an example in which the first predetermined movement is a wrist raise movement characteristic, in a process in which a user uses a wearable device, the user performs a wrist raise movement at a relatively high speed. Therefore, the wrist raise movement may be completed within a time, that is, a height above sea level of the wearable device changes relatively fast within a time, that is, a height difference is relatively large. If a normal behavior of the user is satisfied, setting a first timer can ensure that the first predetermined movement is determined more accurately, thereby increasing accuracy in a process of determining whether the first predetermined movement is satisfied.

Before 102, the method further includes 106 to 108.

106: Obtain a time recorded by the first timer.

107: Determine whether the time recorded by the first timer is less than or equal to a first time threshold.

When the time recorded by the first timer is less than or equal to the first time threshold, 102 is performed.

108: When the time recorded by the first timer is greater than the first time threshold, skip triggering the terminal to turn on the display screen, and continue to monitor the height difference and the acceleration.

According to the display screen control method provided in this embodiment of the present invention, after a height difference and an acceleration that are generated when a terminal moves from an initial position to a target position are obtained, a time of moving from the initial position to the target position to generate the height difference is obtained, and whether a first predetermined movement is satisfied is determined according to the obtained height difference and acceleration and the time for generating the height difference. When the first predetermined movement is satisfied, the terminal is triggered to turn on a display screen. Compared with the prior art, in this embodiment of the present invention, not only an acceleration generated when a wearable device moves from one position to another position is obtained, but also a height difference generated when the wearable device moves from the one position to the another position and a time for generating the height difference are obtained, and a wrist raise movement characteristic is determined according to two parameters: the acceleration and the height difference within the time for generating the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 5:
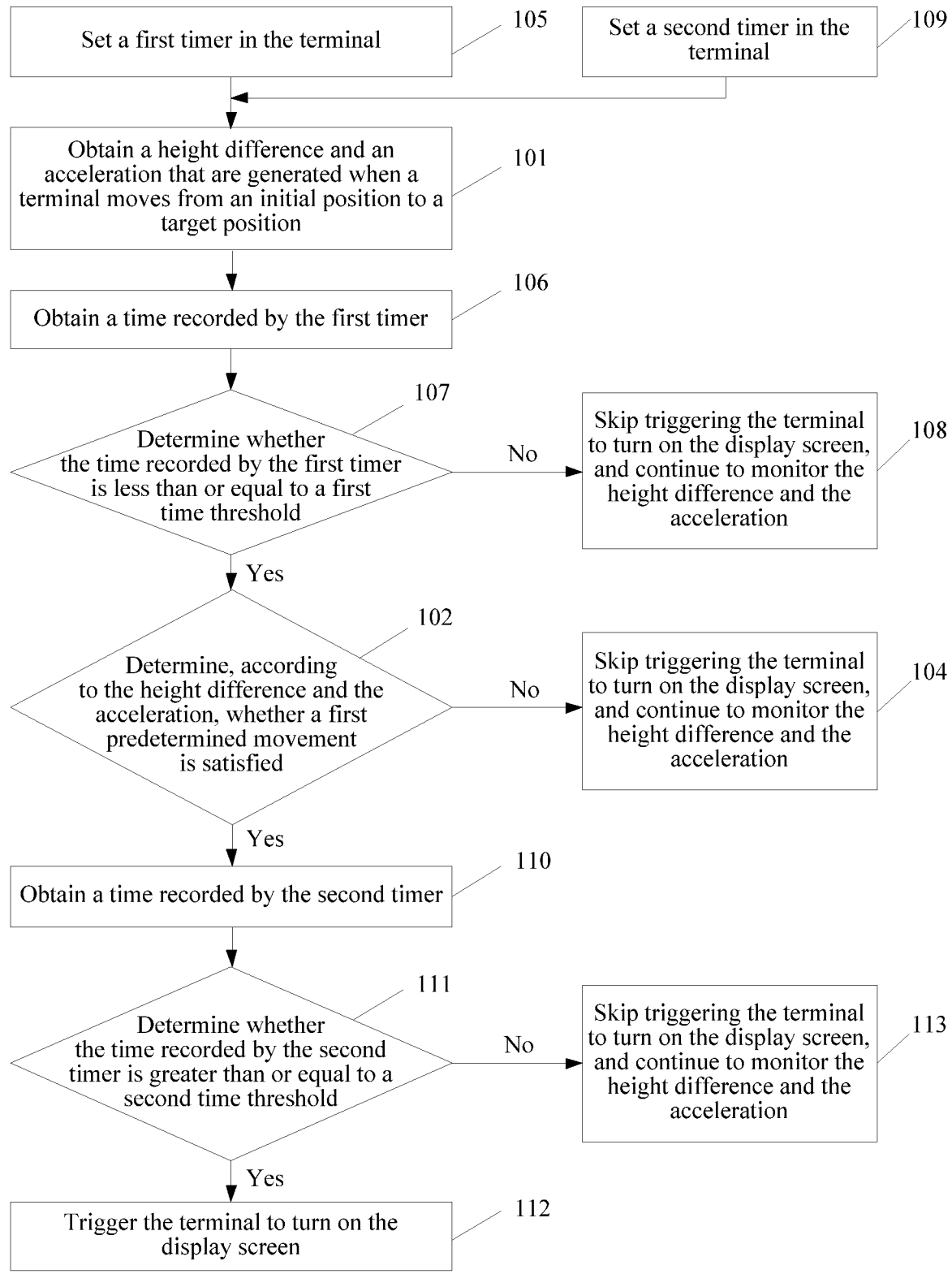
FIG. 5 is a flowchart of another display screen control method according to an embodiment of the present invention.

In this embodiment of the present invention, based on the implementation manner shown in FIG. 4, the method may be further implemented as an implementation manner shown in FIG. 5.

Before 101, the method further includes 109.

109: Set a second timer in the terminal.

The second timer is configured to record a time within which an absolute value of an acceleration after the wrist raise movement characteristic is satisfied is less than or equal to a second acceleration threshold.

Using an example in which the first predetermined movement is a wrist raise movement characteristic, in a process in which a user uses a wearable device, the user performs a wrist raise movement at a relatively high speed, and after the wrist raise movement is completed, a wrist of the user stays in front of the chest for a period of time. Therefore, within a time after the wrist raise movement is completed, it may be detected that an acceleration basically remains unchanged, that is, within a time, an absolute value of the acceleration of the wearable device is less than or equal to a second acceleration threshold. If a normal behavior of the user is satisfied, setting a second timer can ensure that if the first predetermined movement is satisfied, whether a display screen needs to be turned on is determined more accurately, thereby increasing accuracy in a process of determining whether the display screen needs to be turned on.

It should be noted that, 105 and 109 may be performed at the same time, or be performed in a particular order.

After the first predetermined movement is satisfied, the method further includes 110 to 113.

110: Obtain a time recorded by the second timer.

111: Determine whether the time recorded by the second timer is greater than or equal to a second time threshold.

112: When the time recorded by the second timer is greater than or equal to the second time threshold, trigger the terminal to turn on the display screen.

113: When the time recorded by the second timer is less than the second time threshold, skip triggering the terminal to turn on the display screen, and continue to monitor the height difference and the acceleration.

Figure 6:
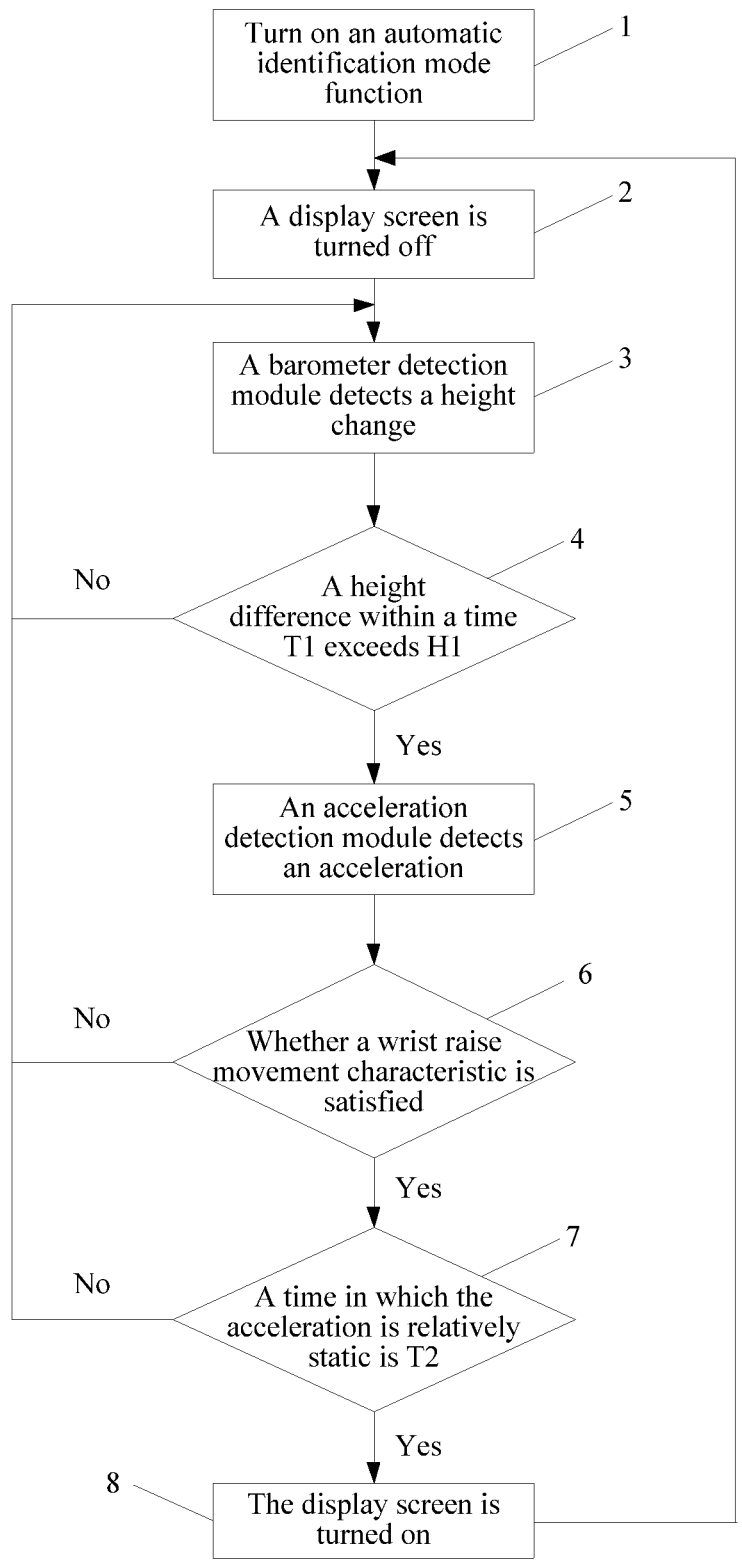
FIG. 6 is a flowchart of a display screen control method in a specific application scenario according to an embodiment of the present invention.

Using a wearable device as an example, the wearable device includes: a barometer detection module and an acceleration detection module. After a user wears the wearable device on a wrist, the user may manually turn on an automatic identification mode function of the wearable device. When the display screen is turned off, a barometer sensor detects a height of the wearable device in real time, and stores, into a corresponding storage area, a numerical value for indicating the height; the barometer detection module calculates a height change of the wearable device in real time according to numerical values that are used for indicating heights and that are stored in the storage area, and stores, into a corresponding storage area, a height difference for indicating a change in the height. When a height above sea level that is within a time T1 and that is obtained by the wearable device is greater than H1, the acceleration detection module is triggered to detect an acceleration; and whether a wrist raise movement characteristic is satisfied is determined according to the acceleration detected by the acceleration detection module and the height difference detected by the barometer detection module. When the wrist raise movement characteristic is satisfied, it is detected whether a time in which the acceleration is relatively static is T2. When the time in which the acceleration is relatively static is T2, the display screen is turned on; and then when the user turns off the display screen or exits an interaction interface of the wearable device, the display screen is turned off. A specific performing process is shown in FIG. 6: 1. Turn on an automatic identification mode function. 2. A display screen is turned off. 3. A barometer detection module detects a change in the height. 4. A height difference within a time T1 exceeds H1. 5. An acceleration detection module detects an acceleration. 6. Whether a wrist raise movement characteristic is satisfied. 7. A time in which the acceleration is relatively static is T2. 8. The display screen is turned on. When an absolute value of the acceleration is approximately equal to 0, that is, when the wearable device is basically in a static status, the acceleration is relatively static.

It should be noted that, after a process of determining whether to turn on a display screen or turn off a display screen is completed, a time of a timer and a numerical value that is detected by a sensor are reset, that is, a parameter currently displayed or stored is returned to zero, and when the determining process is triggered again, detection is performed again.

According to the display screen control method provided in this embodiment of the present invention, after a height difference and an acceleration that are generated when a terminal moves from an initial position to a target position are obtained, whether a first predetermined movement is satisfied is determined according to the obtained height difference and acceleration, and when the first predetermined movement is satisfied, a time in which an absolute value of the acceleration is less than or equal to a second acceleration threshold is obtained. When the time is greater than or equal to the second time threshold, the terminal is triggered to turn on a display screen. Compared with the prior art, in this embodiment of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference. Then, when a time in which an absolute value of the acceleration is less than or equal to a second acceleration threshold is greater than or equal to a second time threshold, the wearable device is triggered to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 7:
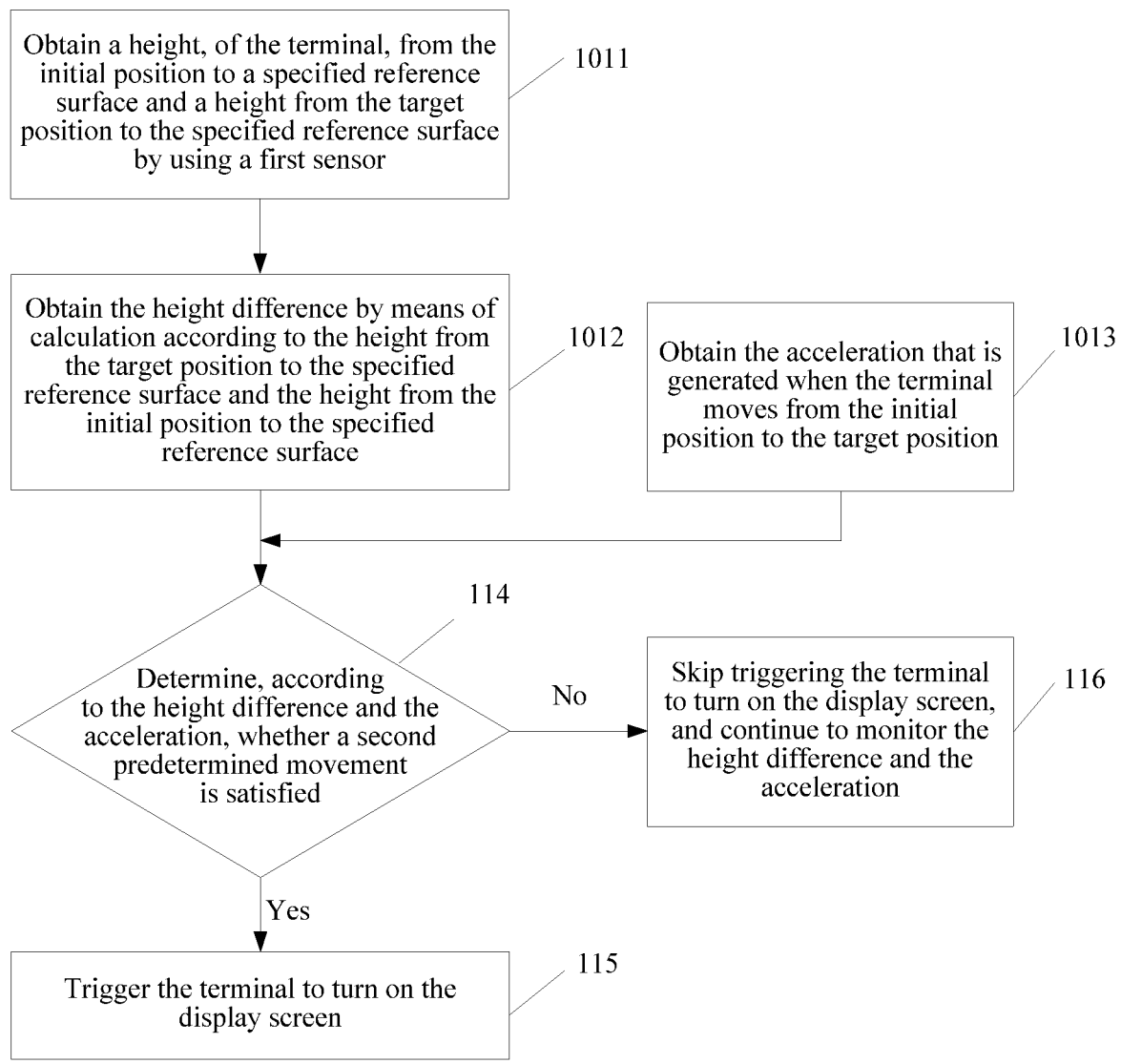
FIG. 7 is a flowchart of another display screen control method according to an embodiment of the present invention.

In this embodiment of the present invention, based on the implementation manner shown in FIG. 2, the method may be further implemented as an implementation manner shown in FIG. 7.

114: Determine, according to the height difference and the acceleration, whether a second predetermined movement is satisfied.

The second predetermined movement includes: the height difference is less than or equal to a second height threshold, and an absolute value of the acceleration is greater than or equal to a third acceleration threshold.

It should be noted that, a height difference calculation manner may be the calculation manner provided in 101 and 1012. Therefore, when a height difference satisfying the first predetermined movement is a positive number, a height difference satisfying the second predetermined movement is a negative number. A value of the third acceleration threshold may be the same as or different from a value of the first acceleration threshold. In processes of determining whether the first predetermined movement and the second predetermined movement are satisfied, the determining is both performed by determining an absolute value of an acceleration and a height difference. Therefore, if a positive direction of the acceleration remains unchanged, when an acceleration satisfying the first predetermined movement is a positive number, an acceleration satisfying the second predetermined movement is a negative number. In both determining processes, the absolute value of the acceleration is a positive number. Therefore, even if the acceleration satisfying the first predetermined movement is different from the acceleration satisfying the second predetermined movement, values of acceleration thresholds for the determining may be the same.

115: When the second predetermined movement is satisfied, trigger the terminal to turn off the display screen.

116: When the second predetermined movement is not satisfied, skip triggering the terminal to turn off the display screen, and continue to monitor the height difference and the acceleration.

According to the display screen control method provided in this embodiment of the present invention, after a height difference and an acceleration that are generated when a terminal moves from an initial position to a target position are obtained, whether a first predetermined movement is satisfied is determined according to the obtained height difference and acceleration. When the first predetermined movement is satisfied, the terminal is triggered to turn on a display screen. When a second predetermined movement is satisfied, the terminal is triggered to turn off a display screen. Compared with the prior art, in this embodiment of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, and when a second predetermined movement is satisfied, the terminal is triggered to turn off the display screen, thereby reducing power consumption caused by the wearable device turning on the display screen due to incorrect identification of a wrist raise movement characteristic, and reducing power consumption caused by the wearable device turning on the display screen again, after turning off the display screen, due to incorrect identification of a wrist raise movement characteristic.

Figure 8:
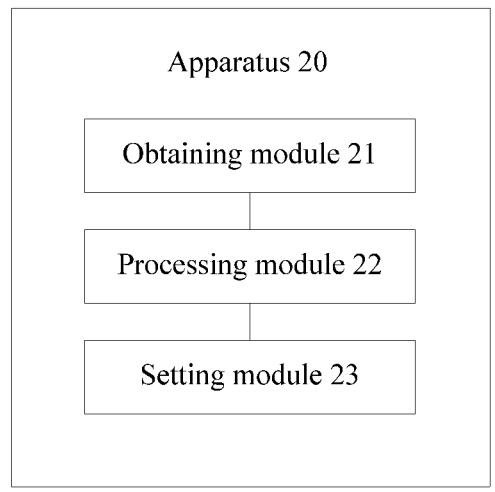
FIG. 8 is a schematic structural diagram of a display screen control apparatus according to an embodiment of the present invention.

As shown in FIG. 8, an embodiment of the present invention further provides a display screen control apparatus 20. As shown in FIG. 8, the apparatus 20 includes: an obtaining module 21, configured to obtain a height difference and an acceleration that are generated when a terminal moves from an initial position to a target position, where the height difference is a difference between a height of the target position and a height of the initial position; and a processing module 22, configured to determine, according to the height difference and the acceleration, whether a first predetermined movement is satisfied, where the first predetermined movement includes: the height difference is greater than or equal to a first height threshold, and an absolute value of the acceleration is greater than or equal to a first acceleration threshold; and when the first predetermined movement is satisfied, trigger the terminal to turn on a display screen.

In this embodiment of the present invention, the obtaining module 21 is specifically configured to obtain a height, of the terminal, from the initial position to the specified reference surface and a height from the target position to the specified reference surface by using a first sensor, where the first sensor is configured to detect a height from the terminal to the specified reference surface; and obtain the height difference by means of calculation according to the height from the target position to the specified reference surface and the height from the initial position to the specified reference surface.

In this embodiment of the present invention, the obtaining module 21 is specifically further configured to obtain, by using a second sensor, the acceleration that is generated when the terminal moves from the initial position to the target position, where the second sensor is configured to detect the acceleration.

In this embodiment of the present invention, the apparatus 20 further includes: a setting module 23, configured to set a first timer on the terminal, where the first timer is configured to record a time of moving from the initial position to the target position to generate the height difference.

The obtaining module 21 is further configured to obtain the time recorded by the first timer.

The processing module 22 is further configured to determine whether the time recorded by the first timer is less than or equal to a first time threshold; and when the time recorded by the first timer is less than or equal to the first time threshold, perform the determining, according to the height difference and the acceleration, whether a first predetermined movement is satisfied.

In this embodiment of the present invention, the setting module 23 is further configured to set a second timer on the terminal, where the second timer is configured to record a time within which an absolute value of an acceleration after the wrist raise movement characteristic is satisfied is less than or equal to a second acceleration threshold.

The obtaining module 21 is further configured to obtain the time recorded by the second timer.

The processing module 22 is further configured to: when the time recorded by the second timer is greater than or equal to a second time threshold, trigger the terminal to turn on the display screen.

In this embodiment of the present invention, the processing module 22 is further configured to determine, according to the height difference and the acceleration, whether a second predetermined movement is satisfied, where the second predetermined movement includes: the height difference is less than or equal to a second height threshold, and an absolute value of the acceleration is greater than or equal to a third acceleration threshold; and when the second predetermined movement is satisfied, trigger the terminal to turn off the display screen.

According to the display screen control apparatus provided in this embodiment of the present invention, after a height difference and an acceleration that are generated when a terminal moves from an initial position to a target position are obtained, whether a first predetermined movement is satisfied is determined according to the obtained height difference and acceleration, and when the first predetermined movement is satisfied, the terminal is triggered to turn on a display screen. Compared with the prior art, in this embodiment of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

Figure 9:
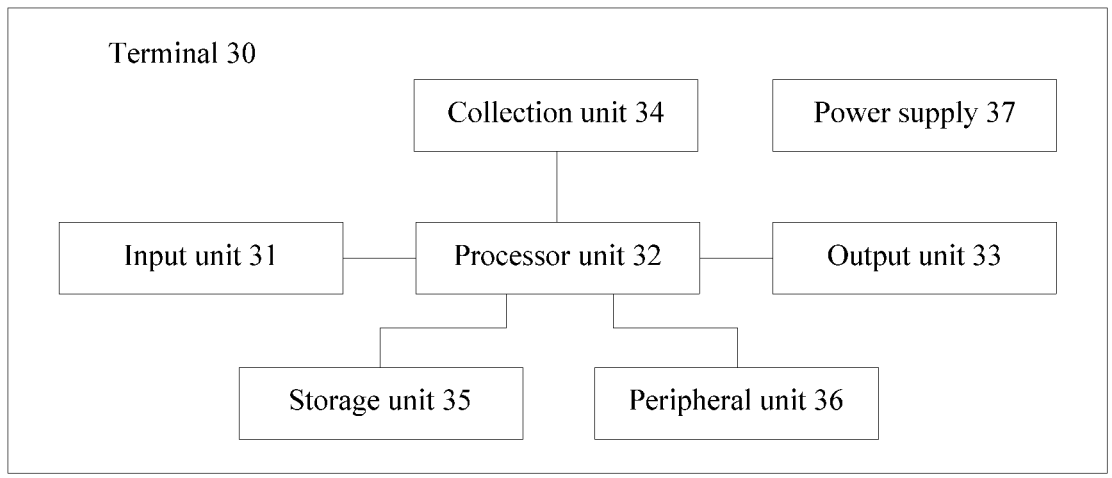
FIG. 9 is a schematic structural diagram of a terminal according to an embodiment of the present invention.

An embodiment of the present invention further provides a terminal 30. A possible specific implementation manner of the terminal 30 is shown in FIG. 9, and includes components such as an input unit 31, a processor unit 32, an output unit 33, a collection unit 34, a storage unit 35, and a peripheral unit 36. These components perform communication by using one or more buses. A person skilled in the art may understand that the structure of the terminal 30 shown in the figure does not constitute a limitation to the present invention and may be a bus-form structure or a star-form structure, and the terminal 30 may further include more components or fewer components than those shown in the figure, or some components may be combined, or a different component deployment may be used. In an implementation manner of the present invention, the terminal 30 may be any mobile or portable electronic device, and includes, but is not limited to, a mobile phone, a mobile computer, a tablet computer, a personal digital assistant (PDA), a media player, a smart television, and a combination of the foregoing two or more.

The input unit 31 is configured to implement interaction between an operator and the terminal 30 and/or input information to the terminal 30. For example, the input unit 31 may receive digit or character information input by an operator, to generate signal input related to the operator or function control. In a specific implementation manner of the present invention, the input unit 31 may be a touch panel, or may be another human-computer interaction interface, such as a physical input key or a microphone, or may be another external information capturing apparatus, for example, a camera. The touch panel, which is also referred to as a touchscreen or a touch screen, can collect an operation action of the user on or near the touch panel, for example, an operation action of the user on the touch panel or in a position near the touch panel by using any suitable object or accessory such as a finger or a stylus, and drive a corresponding connection apparatus according to a preset program. Optionally, the touch panel may include two parts: a touch detection apparatus and a touch controller. The touch detection apparatus detects a touch operation by a user, converts the detected touch operation into an electrical signal, and transmits the electrical signal to the touch controller. The touch controller receives the electrical signal from the touch detection apparatus, converts the electrical signal into coordinates of a touch point, and then sends the coordinates to the processor unit 32. The touch controller may further receive and execute an order sent by a processing unit. In addition, the touch panel may be a resistive, capacitive, infrared (Infrared), or surface acoustic wave touch panel. In another implementation manner of the present invention, the physical input key used by the input unit 31 may include, but is not limited to, one or more of a physical keyboard, a functional key (such as a volume control key or a switch key), a trackball, a mouse, and a joystick. The input unit in a microphone form may collect voice input by a user or an environment, and convert the voice into an order that is in an electrical-signal form and that may be executed by the processing unit.

In some other implementation manners of the present invention, the input unit 31 may further be various sensing devices, for example, a Hall device, configured to detect a physical quantity of the terminal 30, such as a force, a torque, a pressure, a stress, a location, a displacement, a speed, an acceleration, an angle, an angular velocity, a revolution, a rotational speed, and a time at which a working state changes, to convert the physical quantity into a quantity of electricity to perform detection and control. Some other sensing devices may further include a gravity sensor, a tri-axis accelerometer, a gyroscope, and the like.

The processor unit 32 is a control center of the terminal 30, is connected to each part of the entire terminal 30 by using various interfaces and lines, and runs or executes a software program and/or module stored in the storage unit 35, and invokes data stored in the storage unit 35, to execute various functions of the terminal 30 and/or process data. The processor unit 32 may include an integrated circuit (IC), for example, may include a single packaged IC, or may include multiple connected ICs having a same function or different functions. For example, the processor unit 32 may include only a central processing unit (CPU), or may include a combination of a GPU, a digital signal processor (DSP), and a control chip (such as a base band chip) in the collection unit 34. In an implementation manner of the present invention, the CPU may be a single computing core or may include multiple computing cores.

The collection unit 34 is configured to establish a communications channel, and collect data, so that the terminal 30 uses the communications channel to connect to a device such as a network device, and collect data, where the terminal 30 may specifically be a remote server, and download media data from the remote server. The collection unit 34 may include a communications module such as a wired local area network module, a wireless local area network (wireless LAN) module, a Bluetooth module, or a base band module, and a radio frequency (RF) circuit corresponding to the communications module, to perform wireless local area network communication, Bluetooth communication, infrared communication and/or cellular communications system communication, for example, Wideband Code Division Multiple Access (W-CDMA) and/or High Speed Downlink Packet Access (HSDPA). The communications module is configured to control communication of various components in the terminal 30, and may support direct memory access.

The output unit 33 includes, but is not limited to an image output unit and an audio output unit. The image output unit is configured to output a text, an image, and/or a video. The image output unit may include a display panel, for example, a display panel configured by using an LCD (Liquid Crystal Display), an OLED (Organic Light-Emitting Diode), a field emission display (FED), or the like. Alternatively, the image output unit may include a reflective display, for example, an electrophoretic display, or a display using an interferometric modulation of light technology. The image output unit may include a single display or multiple displays of different sizes. In a specific implementation manner of the present invention, the touch panel used by the input unit 31 may also be used as a display panel of the output unit 33. For example, after detecting a gesture operation of touching on or getting close to the touch panel, the touch panel transfers the touch operation to the processor unit 32, so as to determine a type of a touch event. Then, the processor unit 32 provides corresponding visual output on the display panel according to the type of the touch event. Although in FIG. 9, the input unit 31 and the output unit 33 serve as two independent parts to implement input and output functions of the terminal 30, in some embodiments, the touch panel and the display panel may be integrated to implement the input and output functions of the terminal 30. For example, the image output unit may display various graphical user interfaces (GUI) as virtual control components, which include, but are not limited to, a window, a scroll bar, an icon, and a clipboard, for the user to perform an operation by means of touch control. In a specific implementation manner of the present invention, the image output unit includes a filter and an amplifier, which are configured to filter and amplify a video output by the processor unit 32. The audio output unit includes a digital-to-analog converter, configured to convert, from a digital format into an analog format, an audio signal that is output by the processor unit 32.

The storage unit 35 may be configured to store a software program and module, and the processor unit 32 runs the software program and module stored in the storage unit 35, to execute various function applications of the terminal 30 and implement data processing. The storage unit 35 mainly includes a program storage area and a data storage area. The program storage area may store an operating system, an application program required by at least one function, such as a sound playback program and an image display program. The data storage area may store data (such as audio data and an address book) created according to use of the terminal 30, and the like. In a specific implementation manner of the present invention, the storage unit 35 may include a volatile memory, for example, a nonvolatile random access memory (NVRAM), a phase change random access memory (PRAM), or a magnetoresistive random access memory (MRAM), and may further include a nonvolatile memory, for example, at least one magnetic storage device, an electrically erasable programmable read-only memory (EEPROM), or a flash memory, for example, an NOR flash memory or an NAND flash memory. The nonvolatile memory stores the operating system and the application program executed by the processor unit 32. The processor unit 32 loads a running program and data from the nonvolatile memory to memory, and stores digital content in a large scale storage apparatus. The operating system is used for control and management of regular system tasks, such as memory management, storage device control, and power management, and various components and/or drivers that facilitate communication between various types of software and hardware. In an implementation manner of the present invention, the operating system may be the Android™ system of Google™, the iOS™ system developed by Apple™, or the Windows™ operating system developed by Microsoft™, or may be a built-in operating system such as Vxworks™. The application program includes any application installed in the terminal 30, and includes, but is not limited to, a browser, an e-mail, an instant messaging service, text processing, keyboard virtualization, a window widget, encryption, digital copyright management, speech recognition, speech replication, positioning (for example, a function provided by a global positioning system), music play, and the like.

A power supply 37 is configured to supply power to different components of the terminal 30 to maintain running of the components. As general understanding, the power supply 37 may be a built-in battery, such as a common lithium-ion battery or a nickel metal hydroxide (NiMH) battery, or may include an external power supply, for example, an alternating current (AC) adapter, that directly supplies power to the terminal 30. In some implementation manners of the present invention, the power supply 37 may also have broader definitions, for example, may also include a power management system, a charging system, a power failure detection circuit, a power converter or inverter, a power status indicator (for example, a light emitting diode), and any other component related to generation, management, and distribution of electric energy for the terminal 30.

In this embodiment of the present invention, the collection unit 34 is configured to obtain a height difference and an acceleration that are generated when the terminal 30 moves from an initial position to a target position, where the height difference is a difference between a height of the target position and a height of the initial position.

The processor unit 32 is configured to determine, according to the height difference and the acceleration, whether a first predetermined movement is satisfied, where the first predetermined movement includes: the height difference is greater than or equal to a first height threshold, and an absolute value of the acceleration is greater than or equal to a first acceleration threshold; and when the first predetermined movement is satisfied, trigger the terminal 30 to turn on a display screen.

In this embodiment of the present invention, the collection unit 34 is specifically configured to obtain a height, of the terminal 30, from the initial position to the specified reference surface and a height from the target position to the specified reference surface by using a first sensor, where the first sensor is configured to detect a height from the terminal 30 to the specified reference surface; and obtain the height difference by means of calculation according to the height from the target position to the specified reference surface and the height from the initial position to the specified reference surface.

In this embodiment of the present invention, the collection unit 34 is specifically further configured to obtain, by using a second sensor, the acceleration that is generated when the terminal 30 moves from the initial position to the target position, where the second sensor is configured to detect the acceleration.

In this embodiment of the present invention, before the obtaining a height difference and an acceleration of the terminal 30, a first timer is set on the terminal 30, where the first timer is configured to record a time of moving from the initial position to the target position to generate the height difference; and before the determining, according to the height difference and the acceleration, whether a first predetermined movement is satisfied, the collection unit 34 is further configured to obtain the time recorded by the first timer.

The processor unit 32 is further configured to determine whether the time recorded by the first timer is less than or equal to a first time threshold; and when the time recorded by the first timer is less than or equal to the first time threshold, perform the determining, according to the height difference and the acceleration, whether a first predetermined movement is satisfied.

In this embodiment of the present invention, before the obtaining a height difference and an acceleration of the terminal 30, a second timer is set on the terminal 30, where the second timer is configured to record a time within which an absolute value of an acceleration after the first predetermined movement is satisfied is less than or equal to a second acceleration threshold; and after the first predetermined movement is satisfied, the processor unit 32 is further configured to obtain the time recorded by the second timer; and when the time recorded by the second timer is greater than or equal to a second time threshold, rigger the terminal 30 to turn on the display screen.

In this embodiment of the present invention, the processor unit 32 is further configured to determine, according to the height difference and the acceleration, whether a second predetermined movement is satisfied, where the second predetermined movement includes: the height difference is less than or equal to a second height threshold, and an absolute value of the acceleration is greater than or equal to a third acceleration threshold; and when the second predetermined movement is satisfied, trigger the terminal 30 to turn off the display screen.

According to the terminal provided in this embodiment of the present invention, after a height difference and an acceleration that are generated when a terminal moves from an initial position to a target position are obtained, whether a first predetermined movement is satisfied is determined according to the obtained height difference and acceleration, and when the first predetermined movement is satisfied, the terminal is triggered to turn on a display screen. Compared with the prior art, in this embodiment of the present invention, not only an acceleration generated when a wearable device moves from one position to another position is obtained, but also a height difference generated when the wearable device moves from the one position to the another position is obtained, and a wrist raise movement characteristic is determined according to two parameters: the acceleration and the height difference, thereby triggering the wearable device to turn on a display screen. Therefore, accuracy when the wearable device identifies a wrist raise movement characteristic is increased, thereby reducing power consumption caused by the wearable device turning on the display screen due to incorrect identification of a wrist raise movement characteristic.

It should be noted that, in the embodiments of the present invention, without special explanation, the description of "being greater than or equal to" should be understood as including any implementation manner of cases of being greater than, being greater than or equal to, or being equal to. In the embodiments of the present invention, without special explanation, the description of "being less than or equal to" should be understood as including any implementation manner of cases of being less than, being less than or equal to, or being equal to.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A method comprising:
  obtaining, by a terminal, a height difference between a height of an initial position of the terminal and a height of a target position of the terminal and an acceleration of the terminal, wherein the terminal moves from the initial position to the target position;

determining, by the terminal, according to the height difference and the acceleration, whether a first predetermined movement is satisfied, wherein the first predetermined movement requires that the height difference be a positive number and be greater than or equal to a first height threshold and that an absolute value of the acceleration be greater than or equal to a first acceleration threshold;

triggering the terminal to turn on a display screen of the terminal, in response to determining that the first predetermined movement is satisfied;

determining, by the terminal, according to the height difference and the acceleration, whether a second predetermined movement is satisfied, wherein the second predetermined movement requires that the height difference be a negative number and be less than or equal to a second height threshold and that an absolute value of the acceleration be greater than or equal to the first acceleration threshold; and triggering the terminal to turn off the display screen, in response to determining that the second predetermined movement is satisfied.

2. The method according to claim 1, wherein obtaining the height difference comprises:
  obtaining a height of the terminal at the initial position relative to a specified reference surface using a first sensor;
  obtaining a height of the terminal at the target position relative to the specified reference surface, using the first sensor; and
  obtaining the height difference by calculating, according to the height of the terminal at the target position relative to the specified reference surface and the height of the terminal at the initial position relative to the specified reference surface.

3. The method according to claim 1, wherein obtaining the acceleration comprises obtaining, using a second sensor, the acceleration that generated by the terminal moving from the initial position to the target position.

4. The method according to claim 1, further comprising:
  setting a first timer on the terminal, wherein the first timer records a time of moving from the initial position to the target position, before obtaining the height difference and the acceleration;
  obtaining the time recorded by the first timer; and
  determining whether the time recorded by the first timer is less than or equal to a first time threshold,
  wherein determining, according to the height difference and the acceleration, whether the first predetermined movement is satisfied is performed in response to the time recorded by the first timer being less than or equal to the first time threshold.

5. The method according to claim 4, further comprising:
  setting a second timer on the terminal, wherein the second timer records a time within which an absolute value of acceleration of the terminal, after the first predetermined movement, is less than or equal to a second acceleration threshold, before obtaining the height difference and the acceleration;
  obtaining the time recorded by the second timer; and
  triggering the terminal to turn on the display screen, in response to the time recorded by the second timer being greater than or equal to a second time threshold.

6. A terminal comprising:
  a processor; and
  a non-transitory computer readable storage medium storing a program for execution by the processor, the program including instructions to:
    obtain a height difference between a height of an initial position of the terminal and a height of a target position of the terminal and an acceleration, wherein the terminal moves from the initial position to the target position;
    determine, according to the height difference and the acceleration, whether a first predetermined movement is satisfied, wherein the first predetermined movement requires that the height difference be a positive number and be greater than or equal to a first height threshold and that an absolute value of the acceleration be greater than or equal to a first acceleration threshold;
    trigger the terminal to turn on a display screen in response to the first predetermined movement is satisfied;
    determine, according to the height difference and the acceleration, whether a second predetermined movement is satisfied, wherein the second predetermined movement requires that the height difference be a negative number and be less than or equal to a second height threshold and that an absolute value of the acceleration be greater than or equal to the first acceleration threshold; and
    trigger the terminal to turn off the display screen, in response to the second predetermined movement is satisfied.

7. The terminal according to claim 6, wherein the instructions further comprise instructions to:
  obtain the height of the terminal at the initial position relative to a specified reference surface using a first sensor;
  obtain the height of the at the target position relative to the specified reference surface using the first sensor; and
  obtain the height difference by calculating, according to the height of the target position relative to the specified reference surface and the height of the initial position relative to the specified reference surface.

8. The terminal according to claim 6, wherein the instructions further comprise instructions to obtain, using a second sensor, the acceleration.

9. The terminal according to claim 6, wherein the instructions further comprise instructions to:
  set a first timer on the terminal, wherein the first timer records a time of the terminal moving from the initial position to the target position;
  obtain the time recorded by the first timer; and
  determine whether the time recorded by the first timer is less than or equal to a first time threshold,
  wherein the instructions to determine whether the first predetermined movement is satisfied are performed in response to determining that the time recorded by the first timer is less than or equal to the first time threshold.

10. The terminal according to claim 9, wherein the instructions further comprise instructions to:
  set a second timer on the terminal, wherein the second timer records a time within which an absolute value of an acceleration, after the first predetermined movement is satisfied, is less than or equal to a second acceleration threshold;
  obtain the time recorded by the second timer; and trigger the terminal to turn on the display screen, in response to determining that the time recorded by the second timer is greater than or equal to a second time threshold.

11. A non-transitory computer readable storage medium storing a program for execution by a processor, the program including instructions for:

obtaining a height difference between a height of an initial position of a terminal and a height of a target position of the terminal and an acceleration generated by the terminal moving from the initial position to the target position;

determining, according to the height difference and the acceleration, whether a first predetermined movement is satisfied, wherein the first predetermined movement requires that the height difference be a positive number and be greater than or equal to a first height threshold and that an absolute value of the acceleration be greater than or equal to a first acceleration threshold;

triggering the terminal to turn on a display screen, in response to determining that the first predetermined movement is satisfied;

determining, by the terminal, according to the height difference and the acceleration, whether a second predetermined movement is satisfied, wherein the second predetermined movement requires that the height difference be a negative number and be less than or equal to a second height threshold and that an absolute value of the acceleration be greater than or equal to the first acceleration threshold; and triggering the terminal to turn off the display screen, in response to determining that the second predetermined movement is satisfied.

12. The storage medium according to claim 11, wherein the instructions further comprise instructions for:

obtaining a height of the terminal of the initial position relative to a specified reference surface;

obtaining a height of the terminal of the target position relative to the specified reference surface using a first sensor; and obtaining the height difference by calculating, according to the height of the target position relative to the specified reference surface and the height of the initial position relative to the specified reference surface.

13. The storage medium according to claim 11, wherein the instructions further comprise instructions for obtaining, using a second sensor, the acceleration generated by the terminal moving from the initial position to the target position.

14. The storage medium according to claim 11, wherein the instructions further comprise instructions for:

setting a first timer on the terminal, before obtaining the height difference and the acceleration, wherein the first timer records a time of the terminal moving from the initial position to the target position;

obtaining the time recorded by the first timer, before determining whether the first predetermined movement is satisfied; and determining whether the time recorded by the first timer is less than or equal to a first time threshold, wherein the instructions for determining whether the first predetermined movement is satisfied are performed in response to determining that the time recorded by the first timer is less than or equal to the first time threshold.

15. The storage medium according to claim 14, wherein the instructions further comprise instructions for:

setting a second timer on the terminal, before obtaining the height difference and the acceleration, wherein the second timer records a time within which an absolute value of an acceleration, after the first predetermined movement is satisfied, is less than or equal to a second acceleration threshold;

obtaining the time recorded by the second timer, after the first predetermined movement is satisfied; and trigger the terminal to turn on the display screen, in response to determining that the time recorded by the second timer is greater than or equal to a second time threshold.

* * * * *